United States Patent [19]

Gute et al.

[11] 4,200,318
[45] Apr. 29, 1980

[54] BUMPER SUPPORTING ENERGY ABSORBER FOR VEHICLES

[75] Inventors: Loren R. Gute, Dayton; Wayne V. Fannin, Xenia, both of Ohio

[73] Assignee: General Motors Corporation, Detroit, Mich.

[21] Appl. No.: 937,934

[22] Filed: Aug. 30, 1978

[51] Int. Cl.² ............................................. B60R 19/08
[52] U.S. Cl. ..................................... 293/136; 267/9 B
[58] Field of Search .............. 267/9 R, 9 A, 9 B, 9 C; 293/132, 133, 136

[56] References Cited

U.S. PATENT DOCUMENTS

| 1,439,209 | 12/1922 | Watson | 267/9 A |
|---|---|---|---|
| 3,788,626 | 1/1974 | Isaacson | 267/9 C |
| 3,948,497 | 4/1976 | Lovitt | 267/9 B |

*Primary Examiner*—Joseph F. Peters, Jr.
*Assistant Examiner*—John A. Carroll
*Attorney, Agent, or Firm*—Charles R. White

[57] ABSTRACT

The energy absorber housing is fixed to the vehicle frame and contains a cylindrical capsule of urethane or other resilient energy-absorbing material. An elongated stepped diameter cylindrical plunger extending inwardly from the bumper has its small diameter portion projecting through a central passage in the capsule. On impact of the bumper the capsule dissipates impact energy by radial deflection as the large diameter portion of the plunger moves into the capsule in response to impact induced movement of the bumper. On removal of the impact load, the capsule recovers to its original shape at a predetermined slow rate and with a force of recovery that acts on a conical wall surface between the two diameter portions of the plunger to return the plunger and the bumper assembly to their original positions.

2 Claims, 3 Drawing Figures

BUMPER SUPPORTING ENERGY ABSORBER FOR VEHICLES

This invention relates to energy absorbers and, more particularly, to an energy-absorbing unit having a capsule of resilient energy-absorbing material radially deflected by a stepped diameter plunger that mounts a bumper to a vehicle for stroking movement between extended and telescoped positions.

Prior to the present invention a wide variety of energy absorber units have been provided to mount bumper assemblies to vehicle frames or uni-body constructions. Some of these units comprise telescoping inner and outer cylinders or equivalent components that are movable from an extended position to a telescoped position in response to application of predetermined impact loads to the bumper assembly. Energy absorber mediums such as viscous fluid spring devices or stretchable bands have been employed with good success for dissipating impact energy. While these energy absorber devices have adequately performed in absorbing impact energy, they are generally elongated for optimized energy absorption stroke, complex in construction, and difficult to service. Additionally some have added objectable weight to the vehicle.

BRIEF SUMMARY OF THE INVENTION

The present invention is drawn to a new and improved lightweight energy absorbing unit having a reduced overall length comprising a stepped diameter plunger with a small diameter portion extending into a central opening into a cylindrical capsule of resilient energy-absorbing capsule mounted in a fixed housing. The capsule is preferably cylindrical and is radially deflected by the large diameter portion of the plunger as it strokes into the housing on impact load applied to the bumper. The energy-absorbing characteristics of the capsule can be tailored to suit various energy-absorbing requirements by increasing or decreasing dimensions of the capsule or by changing its configuration. On removal of the impact load the capsule preferably will slowly return to its original configuration and the recovery forces exerted on a conical surface intermediate the two diameter portions of the plunger force the plunger and the attached bumper to their original pre-impact positions so that they are ready for subsequent service.

It is a feature, object and advantage of this invention to provide a new and improved energy-absorbing unit which is particularly suitable for mounting a vehicle bumper to a chassis frame or other support and which incorporates a minimal number of components to provide a lightweight and highly effective energy absorber active in response to the telescoping of a stepped diameter plunger into a capsule of resilient energy-absorbing material causing the material to deflect and absorb impact energy. On removal of the impact load the capsule recovers to its original configuration and the force of recovery of the capsule in returning to its original shape acts on an inclined shoulder portion of the plunger to force it outwardly to its pre-impact extended position.

It is another feature, object and advantage of this invention to provide an energy-absorbing unit incorporating a pair of telescopically mounted members which provide front and rear bearings for one of the members so that it may support a bumper assembly. The other of said members houses a capsule of resilient energy-absorbing material that deflects radially outwardly in response to movement of the first member into the energy absorbing material to dissipate impact loads. Upon removal of the impact loads, the force of recovery of the capsule exerted on a conical shoulder portion intermediate a stepped diameter portion of the first member will return this member to its outer position and the bumper to its pre-impact position. In the outer position the plunger is pre-loaded by the capsule to yieldably hold the bumper outwardly of the vehicle body.

These and other features, objects and advantages of this invention will be more apparent from the following detailed description and drawing in which:

DETAILED DESCRIPTION

Figure 1:
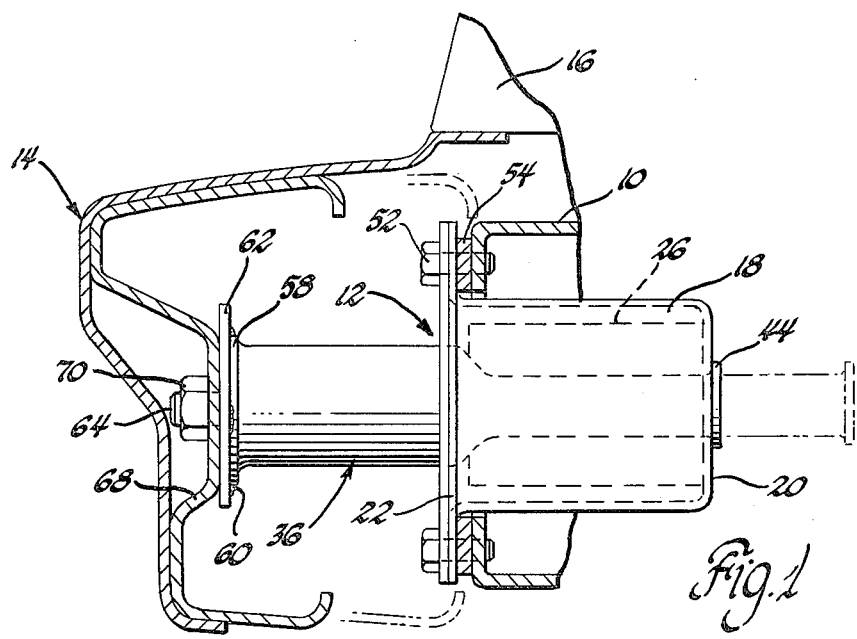
FIG. 1 is a side view partly in section of an automotive vehicle showing part of the chassis frame and an energy-absorbing unit mounting a bumper assembly to the frame.

Referring now to FIG. 1 of the drawings, there is shown a portion of a vehicle which includes one of the side rails 10 of the chassis frame. Secured to the end of the side rail 10 is an energy-absorbing unit 12 that supports a bumper assembly 14 outwardly of the body work 16 of the vehicle. It will be appreciated that the bumper assembly preferably extends outwardly of and laterally across one end of the vehicle and is supported by another energy-absorbing unit laterally spaced from and corresponding to the unit 12. Such bumper support is generally described in our copending application U.S. Ser. No. 856,527, for "Energy Absorber for Vehicles" filed Dec. 1, 1977.

Figure 2:
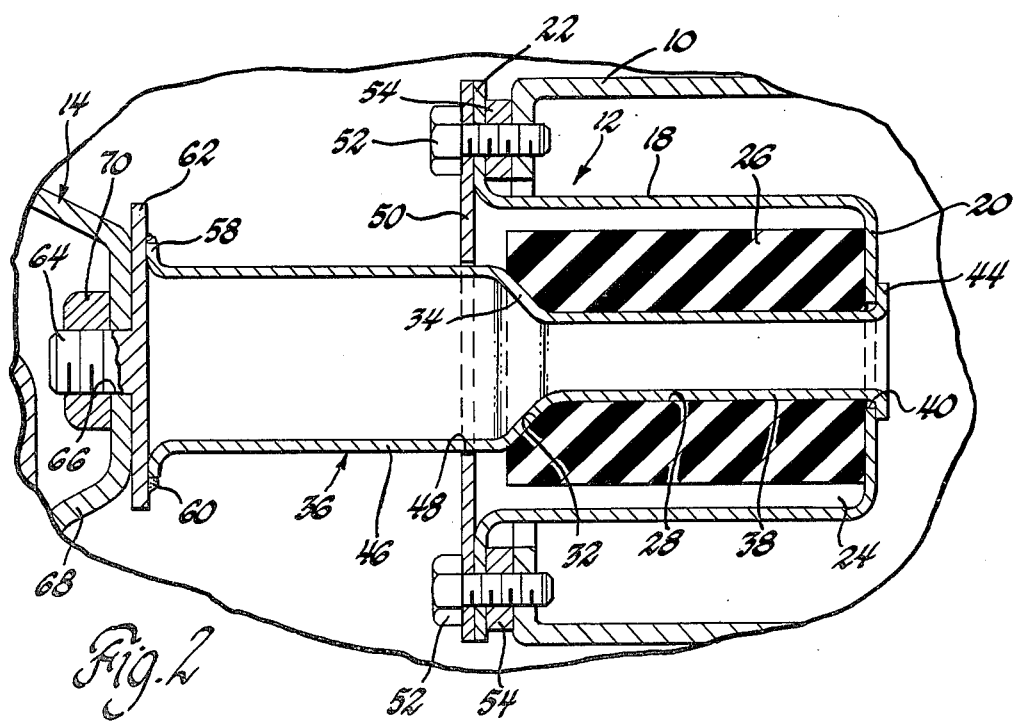
FIG. 2 is an enlarged side sectional view of a portion of FIG. 1.

The energy-absorbing unit 12 comprises a cylindrical housing 18 having an end wall 20 at its inner end and an annular lip portion 22 flaring radially outwardly from the open end thereof. The housing 18 provides a chamber 24 for a cylindrical capsule 26 of a suitable energy-absorbing material such as a temperature stable polyurethane. The radial clearance between the capsule 26 and the housing 18 provides space for radial deflection or flow of the capsule 26 as will be described below. Capsule 26 has a centralized annular passage 28 having an entrance formed by an inwardly tapering conical contact surface 32. This surface provides a seat for a corresponding conical contact shoulder 34 of a tubular, stepped diameter plunger 36 that has an inner, small diameter, stem portion 38 extending through the central passage 28 of the energy-absorbing capsule 26 to support the capsule in housing 18. As shown in FIGS. 1 and 2, the end of the stem portion 38 extends through a central annular opening 40 in the end wall 20 of the capsule forming a bearing and guide for the plunger as it moves with respect to housing 18. After the capsule 26 is installed on stem portion 38 the end of the stem portion is inserted through opening 40 and flared outwardly at 44 to retain the plunger 36 and the capsule in the housing 18. By this installation the capsule is compressively loaded between plunger shoulder 34 and the end wall 20 of the housing to improve the energy-absorbing characteristics of the unit. This pre-load makes the unit operation approach the square wave energy absorption force deflection curve well known in this art.

The plunger 36 has a large diameter portion 46 which extends forwardly from the contact shoulder portion 34 through an annular bearing and guide opening 48 formed in the flat support plate 50. Plate 50 is secured to the annular lip portion 22 of the capsule housing 18 and to the end of the side rail 10 by threaded fasteners 52. Washers 54 are employed between the lip portion 22 of the housing 18 and the end of the side rail as desired. The outer end of the large diameter portion 46 of the plunger is flared at 58 and is welded at 60 or otherwise secured to an annular backing plate 62. Plate 62 has a threaded stud 64 that projects outwardly through a central opening 66 of attachment plate 68 of bumper assembly 14. Nut 70 threaded onto the end of the stud 64 secures the bumper assembly 14 to the outer end of plunger 36.

Figure 3:
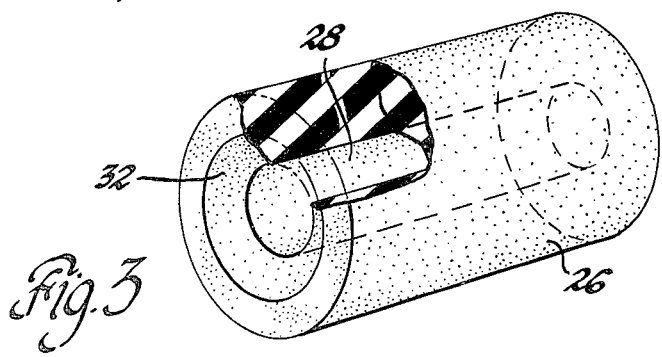
FIG. 3 is a perspective view of a preferred energy absorbing capsule used in the energy absorber of FIGS. 1 and 2.

Impact loads of a predetermined magnitude directed to the bumper assembly 14 will displace the bumper assembly inwardly as indicated in phantom lines in FIG. 1 to cause the telescopic movement of the large diameter portion of the plunger 36 with respect to housing 18. On this stroking movement, the conical shoulder 34 of the plunger will crowd into the material of the capsule causing its flow or deflection in a radial direction. In view of the capsule pre-load, the capsule immediately yieldably resists on plunger movement so that effective dissipation of impact energy begins on the initial movement of inward movement of the bumper assembly. As the plunger strokes inwardly in response to predetermined low speed impacts, such as a 5 mph vehicle impact, it will be guided by the bearing surfaces 40 and 48, respectively. On this stroking movement the capsule is deflected radially to absorb impact energy without any appreciable damage to the vehicle body work. On removal of the impact load, the capsule will gradually return to its original configuration shown in FIGS. 2 and 3 and acting on shoulder portion 34 will squeeze the plunger outwardly at a slow recovery rate to its original position to thereby return the bumper assembly 14 to its impact position. In addition to providing guides for the plunger in its telescoping movement, the openings 40 and 48 provide bearings so that the bumper can be employed as a support element for jacking the car to an elevated position for minor repairs, such as changing tires.

If desired, the capsule can take alternate forms from that disclosed and still provide for the foreshortened energy-absorbing unit described above. For example, the capsule could be formed with radially extending ribs or fingers spaced from one another to contact the inner wall of the housing 18 if desired for radial support of the capsule. Also, the capsule could be formed from a multi-rib band of thin oriented plastic energy-absorbing material such as disclosed in our prior application referenced above.

While this invention has been described in connection with vehicle bumpers, it could be employed for suspensions and other uses. It will be appreciated that various modifications and embodiments of the construction can be made in view of this description and without departing from the disclosure or the scope of the following claims.

We claim:

1. An energy-absorbing unit for mounting a bumper assembly to a support on an automobile comprising a housing having a chamber therein, an energy absorbing capsule of resilient material operatively mounted in said chamber, said energy-absorbing capsule having a peripheral wall spaced inwardly from the inner wall of said housing and having a centralized opening therein extending axially through the length thereof, a stepped diameter plunger mounted for telescopic inward movement from an extended outer position to a collapsed inner position with respect to said housing and said capsule, said plunger having a small diameter stem portion extending through said opening and a large diameter portion extending axially from said stem portion having an outer end for supporting a vehicle bumper said plunger having a conical shoulder portion intermediate the ends thereof interconnecting for initially and directly contacting the material of said capsule adjacent said centralized opening and for subsequently deflecting said resilient capsule radially outwardly in response to an impact load moving said shoulder portion into said capsule as said plunger moves from said extended outer position to said collapsed inner position, and said conical shoulder portion further providing a return surface on which the resilient material of said capsule directly acts to move said plunger from said collapsed position to said extended position in response to removal of said impact load.

2. An energy-absorbing unit for mounting a bumper assembly to a support on an automobile comprising a housing having a peripheral wall forming a chamber, an energy-absorbing capsule of resilient material operatively mounted in said chamber, said energy absorbing capsule having a peripheral wall spaced inwardly from the inner wall of said housing and having a centralized opening therethrough, a stepped diameter plunger mounted for telescopic movement from an extended position to a collapsed position with respect to said housing, said plunger having a small diameter portion extending axially through said centralized opening and having a conical shoulder portion directly contacting the material of said capsule adjacent to the entrance of said centralized opening, said plunger having a large diameter portion extending axially from the base of said conical shoulder portion and terminating in an outer end supporting a vehicle bumper, said housing having front and rear bearing portions for slidably supporting said plunger for movement through said housing, said conical shoulder being sloped to deflect the material of said capsule radially outwardly as said plunger and said shoulder linearly move into said capsule in response to the application of a predetermined impact load to said bumper to absorb and dissipate impact energy and to provide a return surface on which the resilient material of said capsule directly acts to force said plunger to an outward pre-impact position on removal of said impact load.

* * * * *